No. 758,040. PATENTED APR. 26, 1904.
E. L. ANGELL.
WASTE CONTROL FOR PLUMBING FIXTURES.
APPLICATION FILED MAR. 16, 1903.
NO MODEL. 3 SHEETS—SHEET 1.

Witnesses
Chas. Wahlers
Robert Shusier

Inventor
Edw. L. Angell

No. 758,040. PATENTED APR. 26, 1904.
E. L. ANGELL.
WASTE CONTROL FOR PLUMBING FIXTURES.
APPLICATION FILED MAR. 16, 1903.
NO MODEL. 3 SHEETS—SHEET 2.
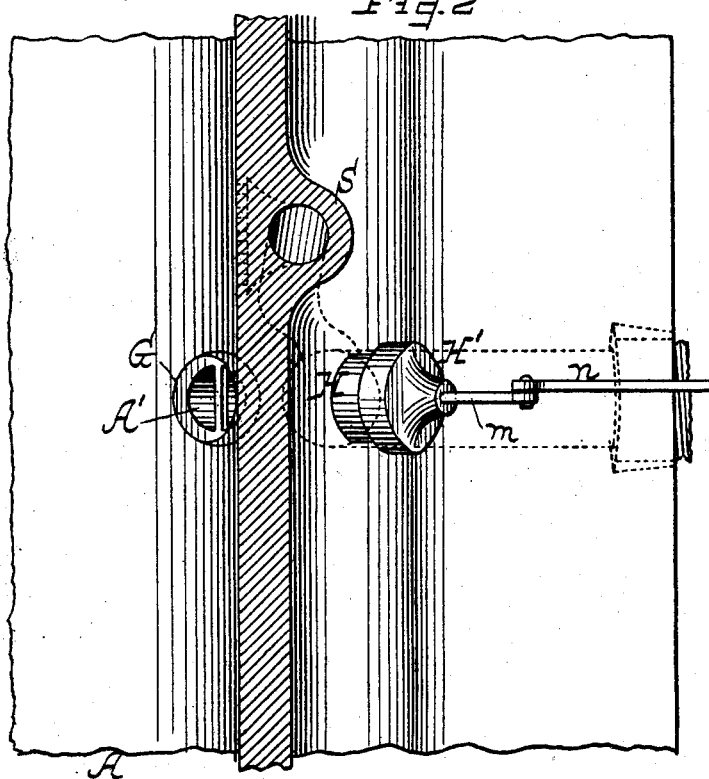
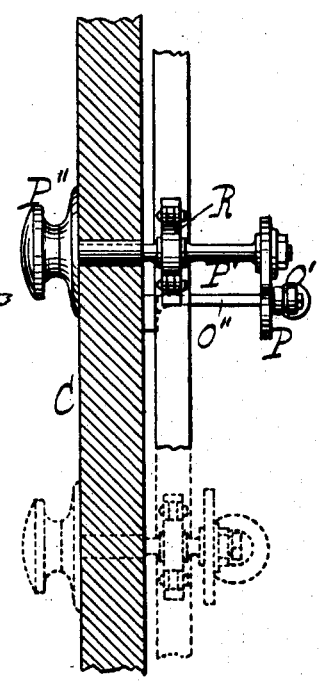
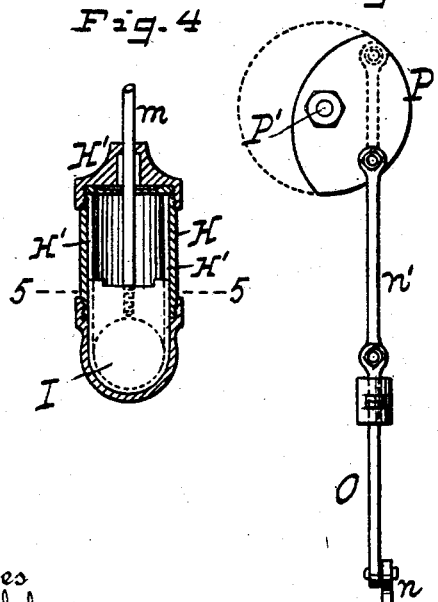
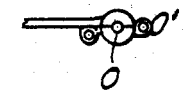
Witnesses
Chas. Wahlers
Robert Schneider
Inventor
Edw. L. Angell No. 758,040. PATENTED APR. 26, 1904.
E. L. ANGELL.
WASTE CONTROL FOR PLUMBING FIXTURES.
APPLICATION FILED MAR. 16, 1903.
NO MODEL. 3 SHEETS—SHEET 3.

Witnesses
Chas. Wahlers
Robert Shuaier

Inventor
Edwd L. Angell.

No. 758,040. Patented April 26, 1904.

UNITED STATES PATENT OFFICE.

EDWARD L. ANGELL, OF NEW YORK, N. Y.

WASTE CONTROL FOR PLUMBING-FIXTURES.

SPECIFICATION forming part of Letters Patent No. 758,040, dated April 26, 1904.

Application filed March 16, 1903. Serial No. 148,078. (No model.)

*To all whom it may concern:*

Be it known that I, EDWARD L. ANGELL, a citizen of the United States, and a resident of New York, in the county of New York and State of New York, have invented certain new and useful Improvements in Waste Control for Plumbing-Fixtures, of which the following is a specification.

My invention relates to devices for controlling the flow of waste water from washbasins, wash-trays, bath-tubs, sinks, urinals, and other similar structures; and it consists in certain novel features, which will first be described with reference to the accompanying drawings and then pointed out in the claims.

Figure 1:
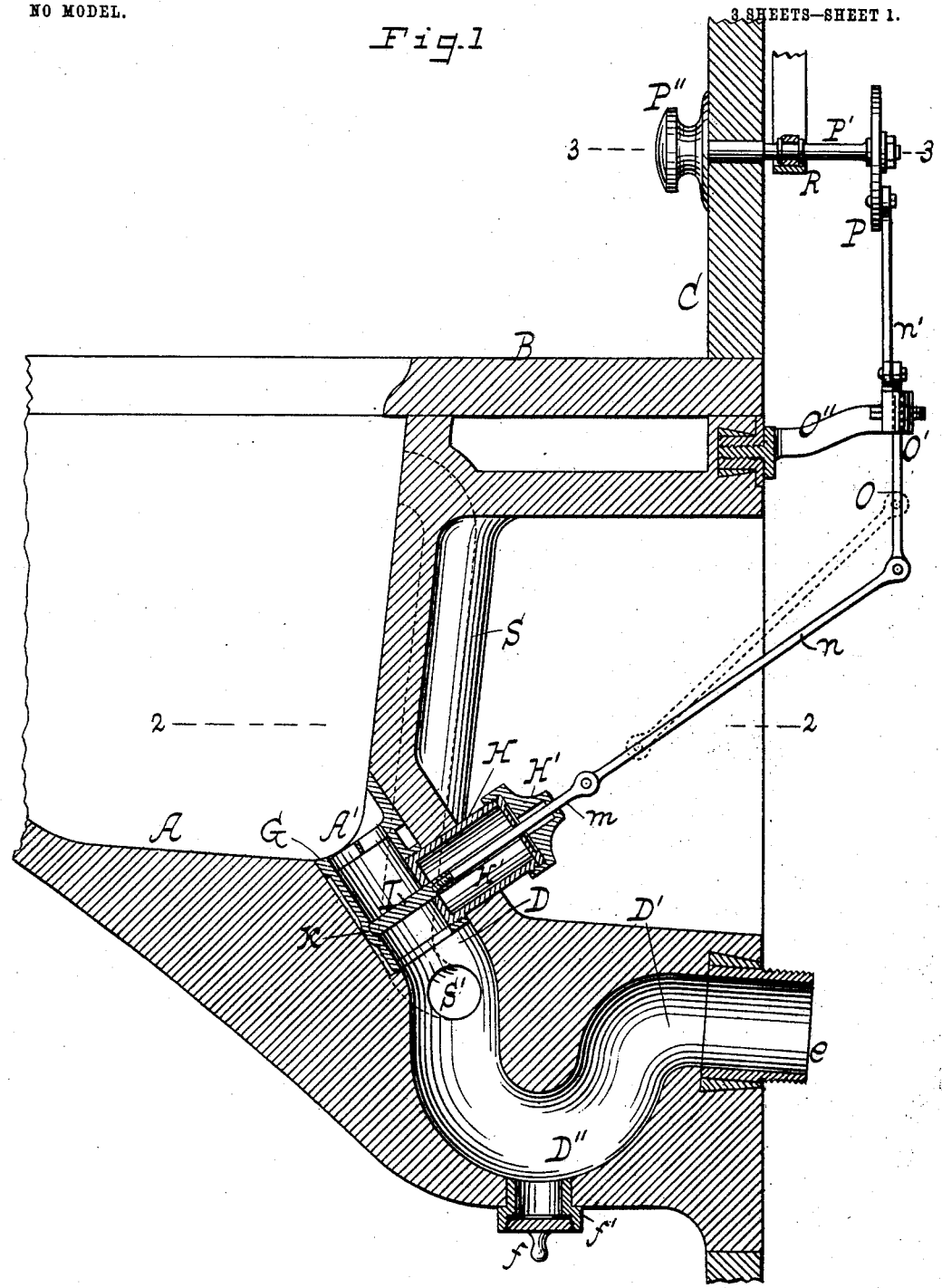
Figure 9:
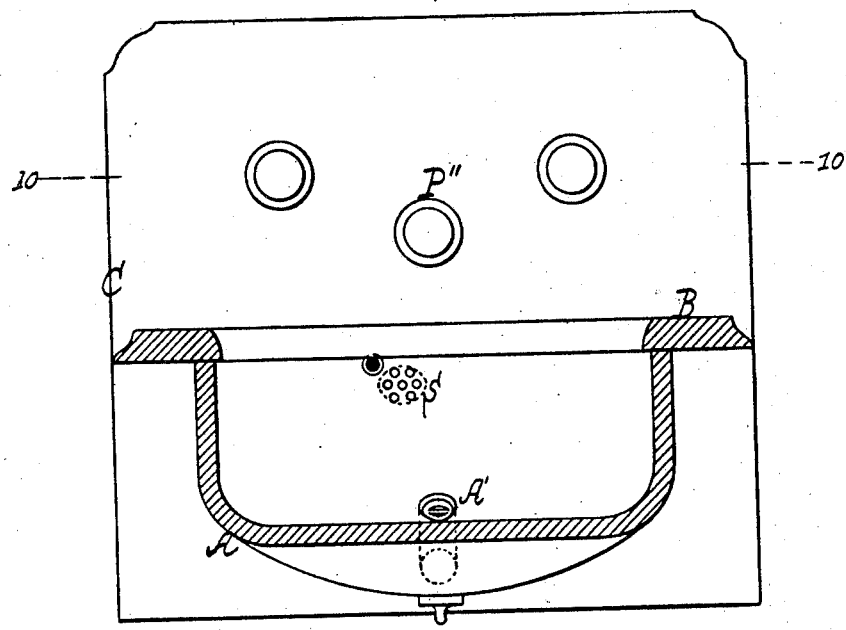
Figure 10:
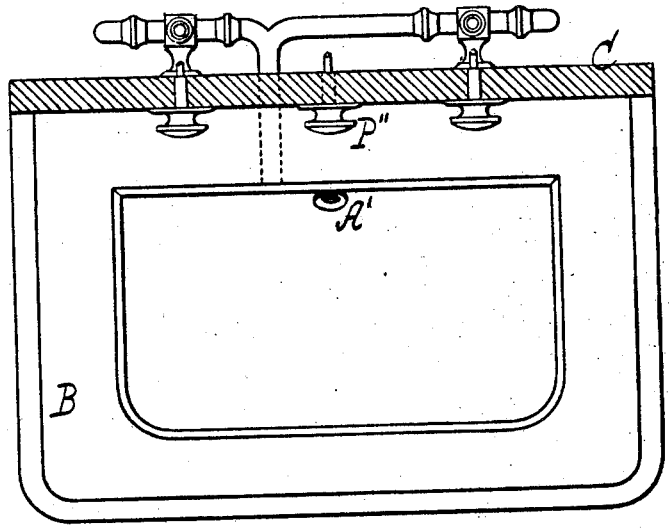

In the drawings, Figure 1 represents a vertical central section of a portion of a washbasin embodying my invention with the outlet-valve in a closed position. Fig. 2 represents a horizontal section thereof in the plane of the line 2 2, Fig. 1. Fig. 3 represents a like section thereof in the plane of the line 3 3, Fig. 1, omitting the basin top and bowl. Fig. 4 represents a longitudinal section of the valve-housing. Fig. 5 represents a cross-section thereof in the plane of the line 5 5, Fig. 4. Fig. 6 represents a detail side view of valve-operating mechanism. Fig. 7 represents a detail side view of a shaft-bearing. Fig. 8 represents a detail side view of a rod-guide. Fig. 9 represents a vertical section of the basin on a smaller scale than in Fig. 1. Fig. 10 represents a horizontal section thereof in the plane of the line 10 10, Fig. 9.

Corresponding parts are marked with the same letters of reference in each of the figures.

The structural parts of the basin structure are the bowl A, the top or slab B, and the back C. The waste-outlet A' is at the junction of the rear wall and the bottom of the basin, and leading from said outlet is a branch D of a waste-passage, another branch, D', of which extends to the rear of the basin structure, where it has a screw-nipple $e$. Both branches D D' of the waste-passage are inclined outwardly and downwardly in relation to the basin, (D having a greater angle than D',) and intermediate of said two branches is a return-bend D'', continuous therewith, which forms a trap operating in the usual manner.

At the base of the trap D'' is a cleaning-plug $f$, which is fitted into a nipple $f'$. Into the branch D of the waste-passage is fitted a sleeve or hollow cylinder G, and to this waste-passage sleeve or cylinder is attached, as by a screw-thread, another hollow cylinder, H, which forms the casing or housing for the outlet-valve I. Said valve-casing H is fitted into a suitable hole of the basin-casting, and its axis lies at an angle to that of the waste-passage cylinder G, so that both cylinders are inclined. The waste-passage cylinder G is open at both ends, while the valve-casing is closed at those points, and the outlet-valve I is arranged to slide in and through the inner closed end of its casing. The sliding valve I consists of a plate, the straight vertical edges of which are fitted into guideways H' of the valve-casing and the lower or working edge of which is rounded to conform to the interior of the waste-passage cylinder, wherein the valve has a seat $k$. A stem $m$ extends outwardly from the valve I through a screw-cap H'' of the valve-casing and is connected by a link $n$ to one end of a sliding rod O, the other end of which is connected by a link $n'$ to a crank or eccentric P, mounted on a rock-shaft P'. Said rod O is fitted in a guideway O' in form of a knuckle attached to the back C, as by a bracket O'', and the rock-shaft P' has its bearing partly in said back and partly in a knuckle R. The rock-shaft P' is located at a convenient point above the basin-slab B and is fitted with a handle in form of a head P'' on the face of the basin-back. It will be apparent that by turning the handle P'' in either direction its motion is transmitted through the eccentric P, link $n'$, sliding rod O, link $n$, and valve-stem $m$ to the valve I to open or to close the waste-passage by its means.

Cored or otherwise formed in the rear wall of the bowl A is an overflow-passage S, the mouth of which is in proximity to the slab B and which communicates with the waste-passage at the point marked S', which is in advance of and above the trap D, so that the latter is common to the waste and overflow passages.

What I claim as my invention, and desire to secure by Letters Patent, is—

1. A wash-basin or similar structure, having a waste passage, a sliding outlet-valve fitted in said passage, a valve-stem, a valve-operating eccentric, a slide-rod, links connecting said rod to both the valve-stem and eccentric, a rock-shaft carrying said eccentric, and a handle on said shaft.

2. A valve for basins and analogous structures provided with a waste-outlet, comprising a sleeve, an opening in the side thereof, a flange at the edge of said opening extending upwardly thereupon but wholly within the geometrical outline of the sleeve, a valve-casing closed at its ends and having its lower end disposed within the flange of the outlet in the side of the sleeve and having its base flush with the inner wall of said sleeve whereby to secure the sleeve in position within said waste-outlet, a slot extending across the base of said valve-casing, guides upon its inner walls adjacent to the ends of said slot, a valve-seat in said sleeve registering with the slot and guides in the valve-casing, a gate-valve slidably disposed in said valve-casing and the guides therein, a cap inclosing the top of said valve-casing having an aperture therein, a stem extending from the top of the valve through the top of the casing, and mechanism connected to said valve-stem for reciprocating said valve, substantially as specified.

Signed at New York, in the county of New York and State of New York, this 19th day of January, A. D. 1903.

EDWARD L. ANGELL.

Witnesses:
   CHAS. WAHLERS,
   ROBERT SHUAIER.